(12) United States Patent
Kim et al.

(10) Patent No.: US 10,476,592 B1
(45) Date of Patent: Nov. 12, 2019

(54) METHOD OF ALIGNING TRANSMIT AND RECEIVE BEAM FOR A FREE-SPACE OPTICAL COMMUNICATION SYSTEM

(71) Applicant: X Development LLC, Mountain View, CA (US)

(72) Inventors: Nam-hyong Kim, San Jose, CA (US); Robert Todd Belt, Los Altos, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/633,971

(22) Filed: Jun. 27, 2017

Related U.S. Application Data

(60) Provisional application No. 62/438,507, filed on Dec. 23, 2016.

(51) Int. Cl.
  *H04B 10/112*  (2013.01)
  *H04B 10/077*  (2013.01)
  *H04B 10/079*  (2013.01)

(52) U.S. Cl.
  CPC ..... *H04B 10/1123* (2013.01); *H04B 10/0775* (2013.01); *H04B 10/07955* (2013.01)

(58) Field of Classification Search
  CPC .......................... H04B 10/112–1129
  See application file for complete search history.

(56) References Cited

U.S. PATENT DOCUMENTS

| 5,347,387 | A  | * | 9/1994  | Rice ............... H04B 10/1125 250/203.2 |
| 6,335,811 | B1 | * | 1/2002  | Sakanaka ............ H04B 10/11 398/129 |
| 7,120,363 | B2 |   | 10/2006 | Andreu-von Euw et al. |
| 7,136,585 | B2 |   | 11/2006 | Bloom |
| 7,457,545 | B2 |   | 11/2008 | Wirth et al. |
| 7,609,972 | B2 |   | 10/2009 | Cunningham et al. |
| 7,991,294 | B2 |   | 8/2011  | Dreischer et al. |
| 8,866,322 | B2 |   | 10/2014 | Tchoryk, Jr. et al. |
| 2002/0081060 | A1 | * | 6/2002  | Margalit ............ G02B 26/0841 385/18 |
| 2003/0035178 | A1 |   | 2/2003  | Seaver |
| 2009/0310784 | A1 | * | 12/2009 | Duligall ............ H04B 10/1141 380/256 |
| 2017/0187467 | A1 | * | 6/2017  | Birnbaum ............ H04B 10/615 |

FOREIGN PATENT DOCUMENTS

CN  102594451 A  7/2012

* cited by examiner

*Primary Examiner* — Nathan M Cors
(74) *Attorney, Agent, or Firm* — Botos Churchill IP Law

(57) ABSTRACT

A fully-passive optical system creates a counter-propagating reference beam, which may be used to evaluate a misalignment between a receive beam, a transmit beam, and a tracking beam. The system can be mated to a motorized tip-tilt stage, and can measure power of received signals and automatically adjust the tip-tilt stage in response. Thus, the system would always maintain bore-sight with the received beam regardless of mechanical shift over time.

18 Claims, 8 Drawing Sheets

METHOD OF ALIGNING TRANSMIT AND RECEIVE BEAM FOR A FREE-SPACE OPTICAL COMMUNICATION SYSTEM

CROSS-REFERENCE TO RELATED APPLICATIONS

The present application claims the benefit of the filing date of U.S. Provisional Patent Application No. 62/438,507 filed Dec. 23, 2016, the disclosure of which is hereby incorporated herein by reference.

BACKGROUND

Transmit and the receive beams of a free-space optical communication (FSOC) system need to be co-linear, often with very tight angular tolerance measured in micro-radians. Some systems also have a separate beacon/tracking beam which must also be aligned with the transmit beam and the receive beam. Misalignment can lead to errors, such as errors in reading bits of data received at the FSOC system from another device.

BRIEF SUMMARY

A fully-passive optical system creates a counter-propagating reference beam, which may be used to evaluate a misalignment between a receive beam, a transmit beam, and a tracking beam. The system can be mated to a motorized tip-tilt stage, and can measure power of received signals and automatically adjust the tip-tilt stage in response. Thus, the system would always maintain bore-sight with the received beam regardless of mechanical shift over time.

One aspect of the disclosure provides a reference system for testing an optical communication system. The reference system includes a receiver adapted to receive an optical beam from the optical communication system, and a transmitter adapted to, simultaneously with the receiving of the optical beam, transmit a reference optical beam that is co-linear with the received optical beam. The references system may further include reflective optics providing for achromatization of the reference system. Examples of such reflective optics include a first focusing mirror positioned to initially receive the optical beam from the optical communication system, and a second focusing mirror positioned opposite the first focusing mirror. According to some embodiments, the reference system includes a first portion and a second portion, wherein the first portion includes optics for redirecting the received optical beam, and wherein the second portion includes a source for generating the reference optical beam. The first and second portions may be coupled by a fiber, such as a photonic crystal fiber. The second portion may include an optical power meter, wherein the optical power meter is adapted to measure an optical power of the received optical beam. A movable stage may support at least a portion of the receiver and the transmitter, the movable stage enabling angular adjustment of the system.

Another aspect of the disclosure provides a system for calibrating an optical communication system under test. The system includes a receiver adapted to receive an optical signal from the optical communication system under test, a receiver tip in optical communication with the receiver through optics arranged to redirect the received optical signal to the receiver tip, and a power meter in optical communication with the receiver tip, the power meter configured to determine a power level of the received optical signal. Further, the system includes an optical signal source adapted to generate a reference beam based on the determined power level of the received optical signal, and a transmitter adapted to transmit the generated reference beam while the receiver continuously receives optical signals from the optical communication system under test. The system may further include one or more processors in communication with the power meter, the one or more processors configured to adjust the system based on the determined power level until the reference beam is colinear with the received optical signal. For example, a motorized platform may support the system, wherein movement of the motorized platform is controlled by the one or more processors.

A further aspect of the disclosure provides a method for calibrating a free space optical communication system. Such method includes receiving, at a reference system, an optical beam transmitted from the optical communication system, generating, at the reference system, a reference optical beam, and determining whether the reference optical beam is colinear with the received optical beam. When the reference optical beam is not colinear with the received optical beam, a position of the reference system is adjusted until the reference optical beam is colinear with the received optical beam. Such adjustment may be automatic, for example controlled by one or more processors of the reference system. The method may further include recording, at the optical communication system, a position of the reference optical beam when the reference optical beam is colinear with the received optical beam. Accordingly, subsequent optical signals received at the optical communication system from other optical communication systems may be compared with the recorded position.

DETAILED DESCRIPTION

Figure 1:
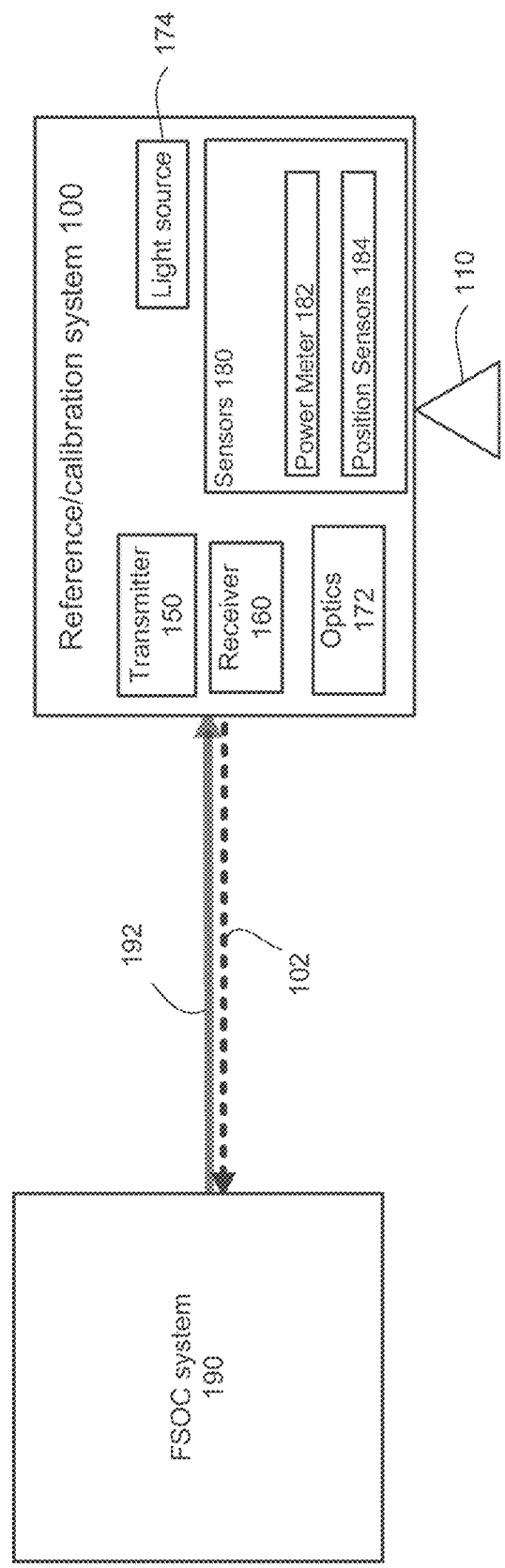
FIG. 1 is a block diagram illustrating a system according to aspects of the disclosure.

The technology relates to a reference system and method for testing and calibrating an optical communication system, such as a free space optical communication (FSOC) system. In particular, a counter-propagating reference beam is generated by the reference system in response to receiving a transmission beam from the FSOC system. As such, the reference system receives the transmission beam from the FSOC simultaneously with sending the reference beam. The reference beam may be used to evaluate any misalignment among transmission beams, receive beams, and tracking beams of the FSOC system.

According to one example, the reference system includes all reflective optics, such as focusing mirrors, which may be used to redirect the transmission beam, reference beam, or any other beam. According to another example, the system is all refractive, using lenses only. According to yet another example, the system is catadioptic, including a combination of lenses and mirrors.

According to one example, a first focusing mirror is positioned at an inner back surface of the reference system, such that when a transmission beam is sent from the FSOC system under test, it first hits the first focusing mirror. A second mirror may be positioned at an opposing inner surface of the reference system, such that when the beam is reflected off the first focusing mirror, it hits the second mirror. The second mirror redirects the beam to, for example, a receiving fiber tip. The second mirror may be a flat mirror, with no optical power, which folds the system to make it compact. According to some examples, the second mirror may be omitted, and the system may be longer.

The receiving fiber tip may be used to transmit a counter beam that is perfectly collinear to the transmission beam received from the FSOC under test. Thus, as the first and second focusing mirrors redirect beams received from the FSOC system to the receiving fiber tip, the first and second focusing mirrors are also redirecting counter beams from the receiving fiber tip to the FSOC system. The reflective optics and other components of the reference system, if refractive, may be achromatic. Accordingly, incoming beams of any wavelength may be tested.

According to some examples, a fiber, such as a microstructure optical fiber, may be coupled to the receiving fiber tip. The fiber may be, for example, a photonic crystal fiber (PCF) or any other fiber. At an opposite end, the fiber may be coupled to an optical signal source, such as a laser. Additionally, the end of the fiber opposite the receiving fiber tip may also be coupled to a power meter. In the example of using a PCF, light may be confined within hollow cores within the fiber. In this regard, optical signals may be sent through the PCF in opposite directions at the same time. For example, while the transmission beam is sent through the PCF in a first direction to the power meter, the counter beam generated by the optical signal source may be sent in a second direction.

The power meter may be used to measure the power of the incoming transmission beam. This measured power may be used to determine and adjust a power level of the counter beam generated by the optical signal source. For example, the incoming beam power can be maximized by tip tilting a movable platform, such as a kinematic stage, on which the reference system is positioned. This may help to improve alignment to the incoming beam. For example, the receive power lever has direct correlation with the alignment of the co-linearity of the incoming and outgoing beams.

The movable platform may provide for roll, pitch, or yaw of the reference system. In some examples, the platform may provide for lateral movement of the reference system.

By generating a reference beam that is collinear to a beam received from the FSOC under test, and transmitted simultaneously, the accuracy and other characteristics of the FSOC under test may be determined. For example, parameters of the reference beam may be compared to the transmission beam, such parameters including alignment, power, intensity, focus, or the like. Once there is confidence that the reference beam is co-linear with the transmission beam, the reference beam can be used to calibrate sensors, such as a camera or position sensor, in the FSOC system. Once the sensors are calibrated, signals from the remote FSOC terminal can be steered, using information from the sensor, such that the local FSOC transmission beam is pointed to a tracking signal for a remote FSOC.

As shown in FIG. 1, reference system 100 may be used to calibrate a device under test, such as FSOC system 190. The FSOC system 190 transmits a first beam 192 to the reference system 100. The first beam 192 may be, for example, an optical signal, such as a laser beam. The reference system 100 transmits a second beam 102, wherein the second beam 102 is collinear to the first beam 192. Because the beam 102 is collinear to the beam 192, it may be used to calibrate sensors of the FSOC system 190. For example, the second beam 102 can used to calibrate a camera, position sensors, signal detectors, power meters, or any other types of sensors at the FSOC system 190.

The reference system 100 includes a transmitter 150 and a receiver 160. The transmitter 150 is configured to send the second beam 102 simultaneously with the receiver 160 receiving the first beam 192.

The second beam 102 may be generated by light source 174. The light source 174 may be a laser or any other type of light source. In some examples, characteristics of the second beam 102 may be varied. For example, the power, intensity, focus, frequency, or any other characteristic of the second beam 102 may be varied. The varying may be effected by the light source 174, the transmitter 150, a combination of these, or any of a variety of other components which are not shown. While the light source is shown as being within a same housing as the transmitter 150 and receiver 160, it should be understood that the light source 174 may be housed separately. Similarly, any or all of the components of the reference system 100 may be housed separately.

The reference system 100 also includes optics 172. The optics 172 may be reflective optics, refractive optics, or a combination of these or other types of optics. For example, the optics 172 may include a focusing mirror, a flat mirror, etc. The optics 172 may be used to, for example, redirect the first beam 192 to the receiver 160 or to other components, such as sensors 180.

The sensors 180 may include, for example, power meter 182, position sensors 184, etc. The power meter may detect a power level of the first beam 192. For example, the power meter 182 may measure a signal to noise ratio (SNR), bit error rate, decibel level, or any other aspect of the first beam's power. In some examples, the power meter 182 communicates with other components, such as a computing device and platform 110, to adjust a positioning of the reference system 100 based on the measured power.

The position sensor 184 may detect, for example, whether the first beam 192 is collinear to the second beam 102. In other examples, the position sensor 184 may detect where, for example on a camera or optics, the first beam 192 hits.

Platform 110 may be used to adjust a position of the reference system 100. The platform 110 may be motorized. The platform 110 may have, for example, three degrees of freedom. Accordingly, the platform 110 may be adapted to adjust a yaw, pitch, or roll of the reference system 100. In other examples, the platform 110 is configured to move the reference system 100 in any of the x, y, or z planes. According to some examples, movement of the platform 110 may be automatically controlled in response to detection, for example by an associated computing device, of characteristics of the first beam 192. For example, it may be determined that the second beam 102 is not collinear to the first beam 192, and an adjustment may be made by moving the platform to an adjusted position in which the first beam 192 and second beam 102 are aligned. Alignment may be determined based on, for example, power level of the received first beam 192.

It should be understood that the reference system 100 may include other components, which are not shown. For example, the reference system 100 may include a modulator, additional sensors, a computing device including one or more processors, or any of a number of other possible components. In some examples the reference system 100 may be incorporated into a FSOC system.

While the system above was described with respect to alignment of a first transmission beam and a second receive beam, it should be understood that additional beams may also be aligned. For example, a tracking beam transmitted by the FSOC system 190 may also be aligned with the second beam 102. Moreover, in some examples, alignment of the beams may be performed periodically or continuously, thereby ensuring continued calibration of the FSOC system 190.

Figure 2:
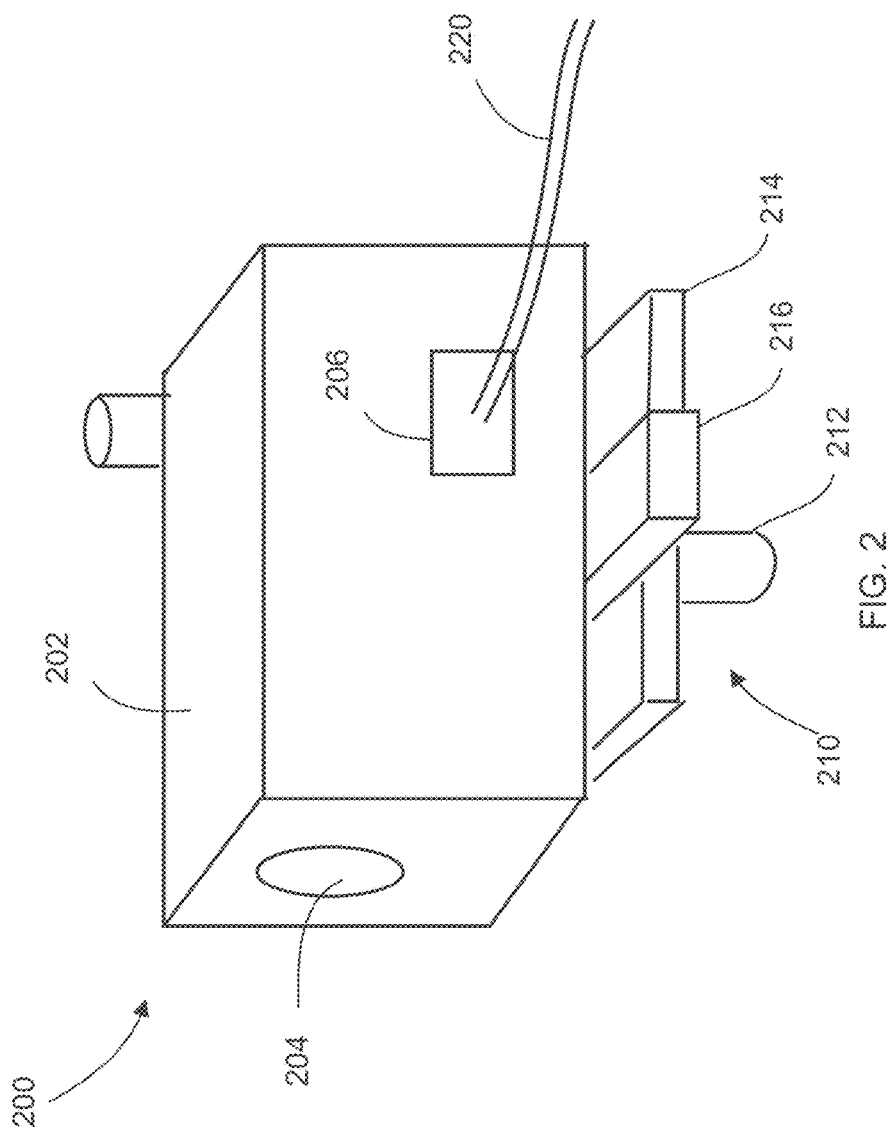
FIG. 2 is a perspective view of a first portion of a reference system according to aspects of the disclosure.

FIG. 2 is a perspective view of a first portion 200 of the reference system 100. As shown, the first portion 200 includes a housing 202, having a first aperture 204 positioned at a front portion of the housing 202, such as on a front surface. The housing 202 may be made of a solid, relatively hard material, such as plastic, metal, polymer, wood, or any other material. While the housing is shown as being generally cuboidal in shape, it should be understood that any shape may be used. The housing 202 may house internal components of the reference system, such as optics, which are discussed in further detail in connection with FIG. 3. The first aperture 204 enables optical signals to be received within the housing 202.

An access opening 206 is positioned at another portion of the housing 202, providing an opening for fiber 220 to reach the internal components of the housing. The fiber 220 is used in this example to connect to further components of the system, such as a light source and a power meter. In other examples, all of the components of the reference system may be positioned within housing, in which case the access opening 206 may not be needed.

Platform 210 enables movement of the housing 202 in any of multiple possible directions. In this example, the platform 210 includes a vertical stand 212, a first horizontal base 214, and a second horizontal base 216. In some examples, the vertical stand 212 may be telescoping, thereby enabling movement of the housing 202 in a vertical direction to higher or lower heights. The first horizontal base 214 and the second horizontal base 216 may each move in one or more directions. For example, the first horizontal base 214 may provide for movement along a first plane that includes the second beam transmitted by the reference system. The second horizontal platform 212 may provide for movement along a second plane substantially perpendicular to the first plane. The platform 210 may further include, for example, one or gimbals (not shown). The one or more gimbals may provide additional degrees of freedom, enabling yaw, pitch, and roll of the housing 202. It should be understood that the platform 210 as described in connection with FIG. 2 is merely an example, and that a variety of different configurations may be used to enable movement of the housing 202.

Figure 3:
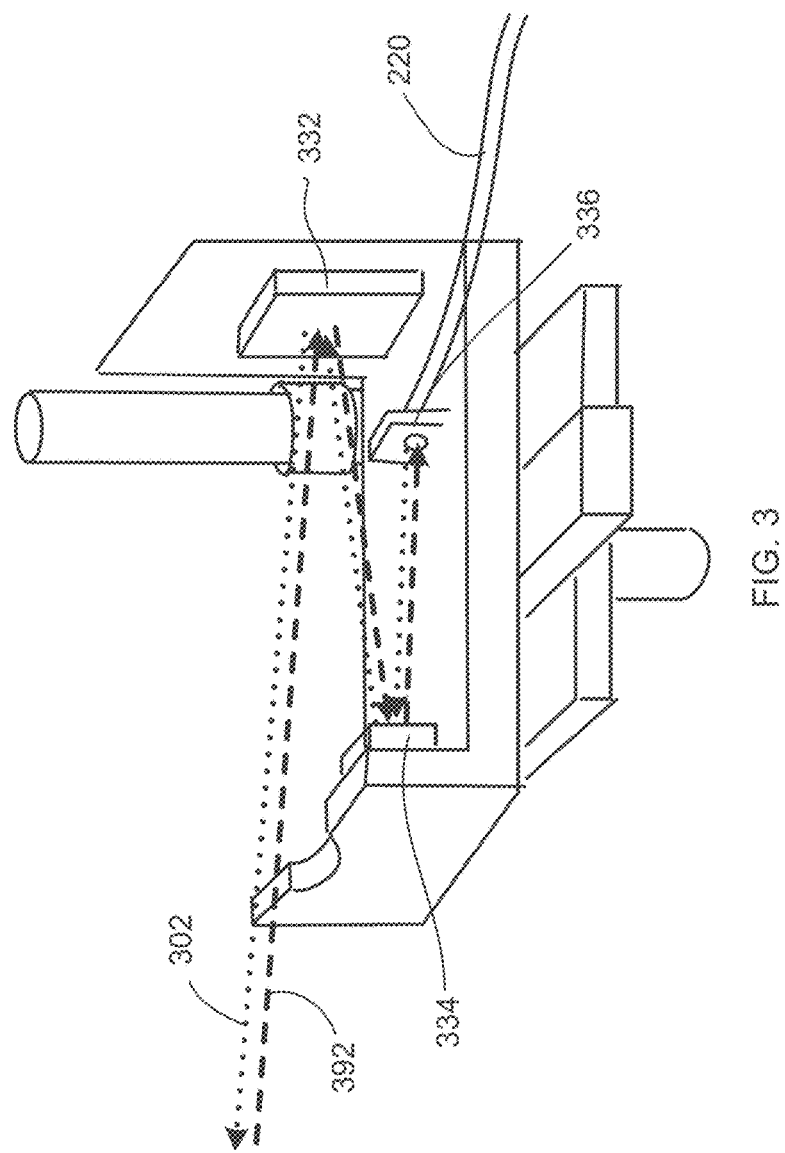
FIG. 3 is a cutaway perspective view of the first portion of the reference system of FIG. 2, illustrating an example of sending and receiving signals according to aspects of the disclosure.

FIG. 3 shows the internal components of the first portion 200 of the reference system. According to some examples, the housing 202 described in connection with FIG. 2 can be partially removed to expose the components shown in FIG. 3, and then replaced. For example, a top portion of the housing may be secured to a bottom potion of the housing via a connection, such as a hinge, a dove-tail connection, or any other type of securement mechanism. As such, the top portion may be removed and replace as desired.

As shown in FIG. 3, the internal components of the first portion of the reference system include optics, such as focusing mirror 332 and flat mirror 334. A first beam 392 is received within the housing. The first beam 392 may originate from an FSOC under test (not shown). As the first beam 392 is received, it hits the focusing mirror 332. The focusing mirror 332 redirects the first beam 392 towards a receiver tip 336. For example, as illustrated, the focusing mirror 332 redirects the first beam 392 to the flat mirror 334, which further directs the first beam 392 to the receiver tip 336. In other examples, a position of the receiver tip 336 is moved in front of the focusing mirror 332 at a predetermined distance. While this may eliminate a need for the flat mirror 334, it may also result in a longer housing to accommodate the predetermined distance.

The focusing mirror 332 may be curved, such as concave or convex. In other examples, the focusing mirror 332 may be a flat focusing mirror. As the optics in FIG. 3 are used to redirect the first beam 392, they are also used to redirect a second beam 302 which is generated at the reference system and transmitted towards the FSOC under test. The second beam 302 is collinear with the first beam 392. In some examples, the second beam 302 is generated at a second portion of the reference system, which is coupled to the first portion via fiber 220.

Fiber 220 is coupled at a first end to the receiver tip 336. The fiber 220 may be coupled at a second end to the second portion of the reference system, as described further in connection with FIG. 4. The fiber 220 may be capable of transmitting signals in multiple directions simultaneously. For example, the fiber 220 may relay the first beam 392 to the second portion of the reference system, while also receiving second beam 302 from the second portion for transmission. The fiber 220 may be, for example, an optical fiber, such as a photonic crystal fiber.

Figure 4:
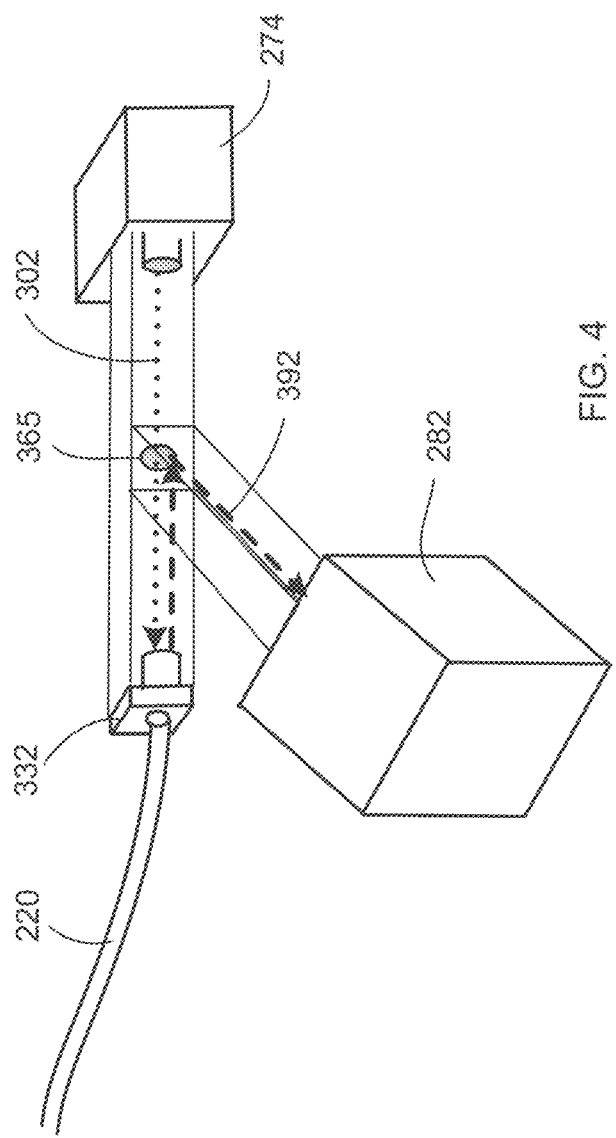
FIG. 4 is a perspective view of a second portion of the reference system according to aspects of the disclosure.

FIG. 4 illustrates the second portion of the reference system, mentioned above. The fiber 220 is coupled to a second tip 322. The first beam 392 that is received at the receiver tip 336 of FIG. 3 is carried through the fiber 220 to the second portion of the reference system, and exits through the second tip 322. The first beam 392 is reflected by optical element 365 towards power meter 282. The optical element 365 may be, for example, a dichroic beam splitter that allows separation of incoming and outgoing light based on its wavelength. The dichroic beam splitter reflects light having a first wavelength, and transmits light having a second wavelength. According to some examples, the beam splitter may be preset or preselected based on wavelengths of the first beam 392 and the second beam 302. As such, the first beam having the first wavelength is reflected to the power meter 282 and the second beam 302 having the second wavelength is transmitted to the fiber 220. The power meter 282 measures a power level of the first beam 392. The measured power may be used, for example, to determine whether the first beam 392 aligns with the second beam 302 outside of the reference system.

Light source 274 generates the second beam 302 simultaneously with the receipt of the first beam 392. For example, the light source 273 may be a laser or any other type of light source. The second beam 302 may pass through optical element 365 to the second tip 332, for transmission through the fiber 220 to the first portion of the reference system, where it may be transmitted.

Figure 5:
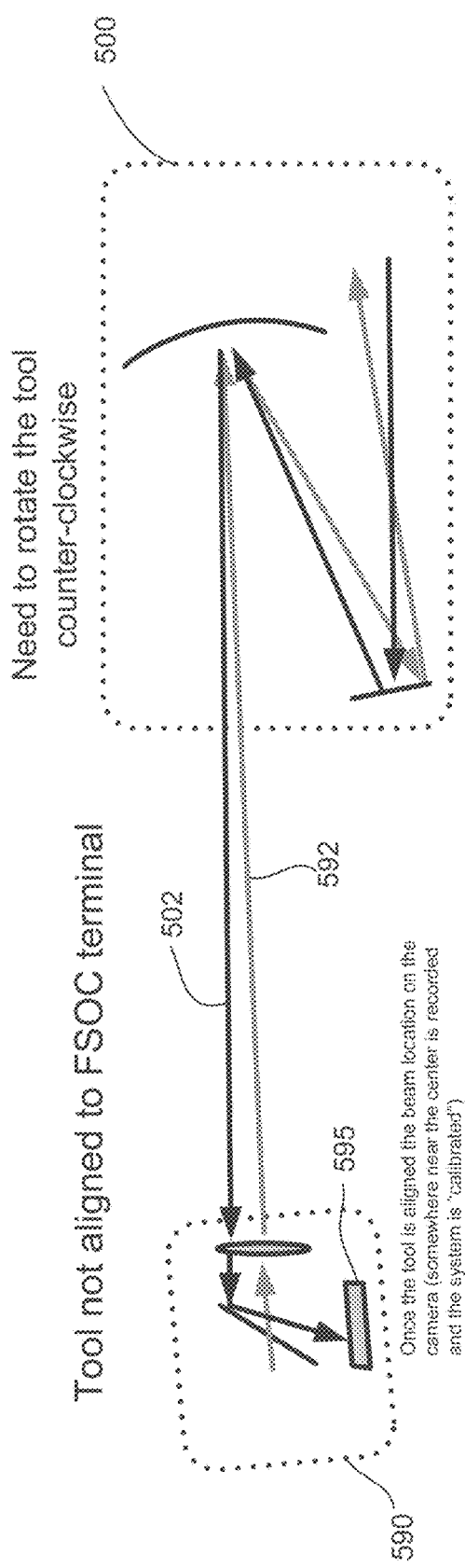
FIG. 5 illustrates an example of aligning a reference beam from the reference system with a beam from an FSOC system according to aspects of the disclosure.

FIG. 5 illustrates an example of aligning a reference beam from the reference system with a beam from an FSOC terminal 590. As shown, first beam 592 transmitted by the FSOC terminal 590 is not aligned with reference beam 502 transmitted by reference system 500. As such, when the reference beam 502 hits a camera 595 of the FSOC terminal 590, it is off-center. If the reference system 500 is rotated counter-clockwise, the first beam 592 would at some point align with the reference beam 302. When the beams are aligned, the reference beam 502 should hit at a center of the camera 595 of the FSOC terminal 590. Once the beams are aligned, a position on the camera 595 where the reference beam 302 hits may be recorded. This recorded position is used to calibrate the FSOC terminal 590.

Figure 6:
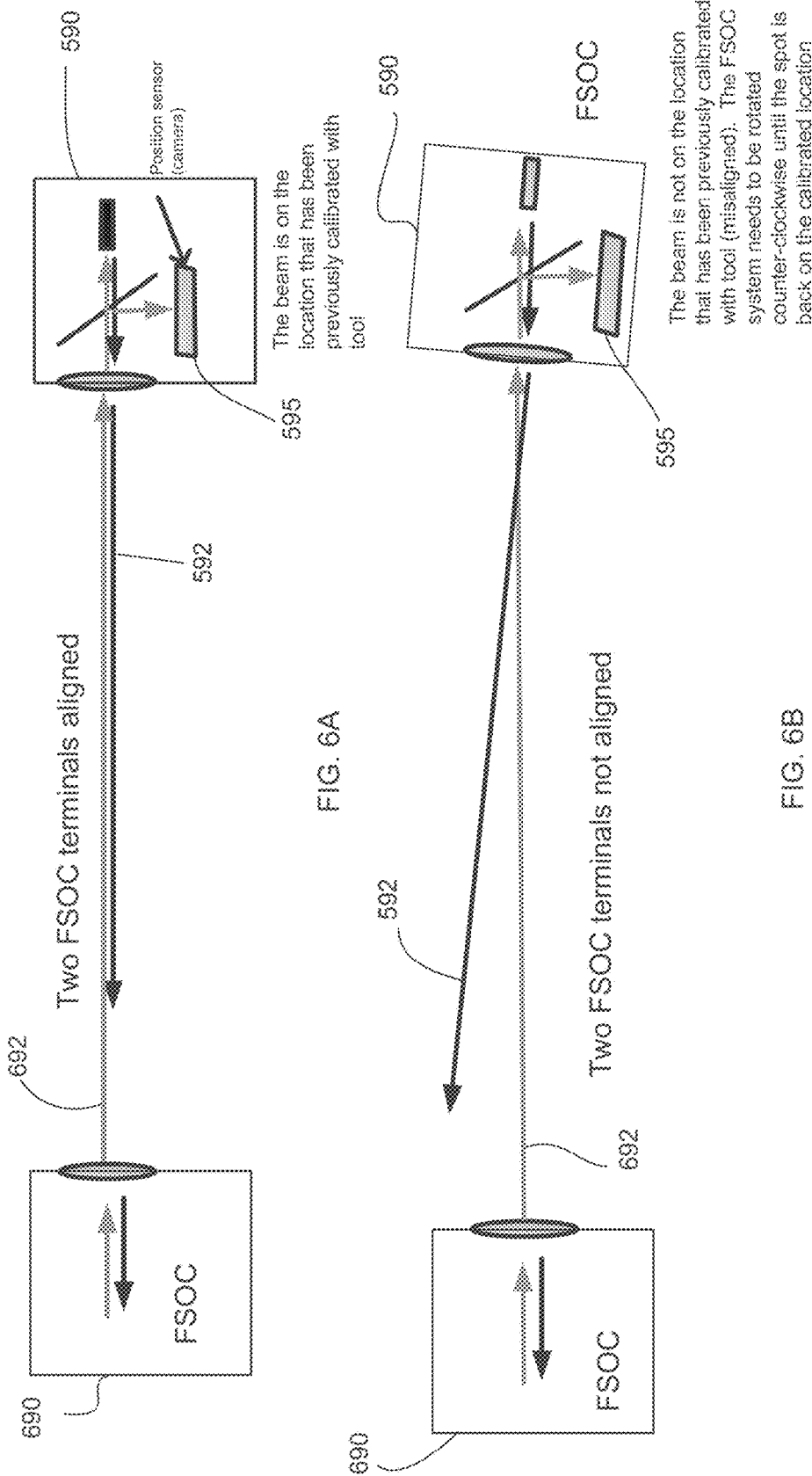
FIGS. 6A-6B illustrate examples of using an FSOC system calibrated using the reference system according to aspects of the disclosure.

FIGS. 6A-6B illustrate examples of using the calibrated FSOC terminal 590 to communicate with another FSOC terminal 690. The calibrated FSOC terminal 590, shown on the right in FIGS. 6A-6B, transmits beam 592. The other FSOC terminal 690, shown on the left, transmits beam 692. In FIG. 6A, the beams 592, 692 are perfectly aligned. As such, the beam 692 hits the camera 595 of the calibrated FSOC 590 in the same location that was previously recorded using the reference system. In FIG. 6B, however, the beams 592, 692 are not aligned, and the beam 692 does not hit the same location of the camera 595 as recorded during calibration using the reference system. The calibrated FSOC terminal 590 may determine, based on where the beam 692 hits the camera 595, that the calibrated FSOC terminal 590 needs to be rotated to ensure alignment.

Figure 7:
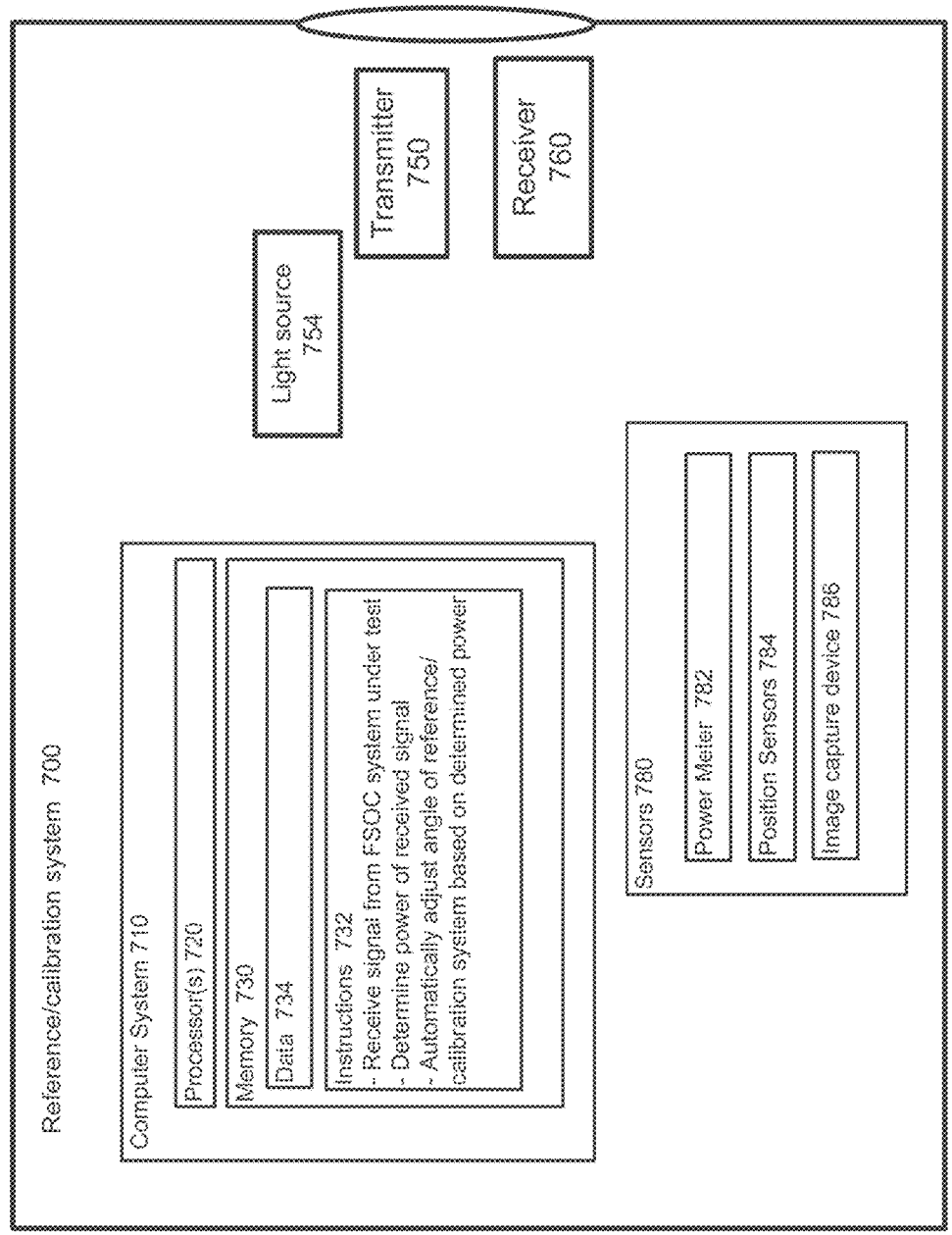
FIG. 7 is a block diagram of an example reference system according to aspects of the disclosure.

FIG. 7 is a block diagram illustrating an example system 700, such as an FSOC reference/calibration system. The system 700 includes various components, including one or more computers, such as computer 710 containing one or more processors 720, memory 730, and other components typically present in general purpose computers. The one or more computers 710 may be in communication with other components, such as transmitter 750, receiver 760, light source 754, and other components that are not shown, such as fibers, amplifiers, circuitry, wiring, etc.

The memory 730 stores information accessible by processor 720, including instructions 732 and data 734 that may be executed or otherwise used by the processor 720. The memory 730 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 732 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 734 may be retrieved, stored or modified by processor 720 in accordance with the instructions 732. For instance, although the system and method is not limited by any particular data structure, the data may be stored in computer registers, in a relational database as a table having a plurality of different fields and records, XML documents or flat files. The data may also be formatted in any computer-readable format. The data may comprise any information, such as numbers, descriptive text, proprietary codes, references to data stored in other areas of the same memory or different memories (including other network locations) or information that is used by a function to calculate the relevant data.

The processor 720 may be any conventional processor, such as processors from Intel Corporation or Advanced Micro Devices. Alternatively, the processor may be a dedicated device such as an ASIC. Although FIG. 7 functionally illustrates the processor, memory, and other elements of computer 710 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Computer 710 may include all of the components normally used in connection with a computer such as a central processing unit (CPU), graphics processing unit (GPU), memory (e.g., RAM and internal hard drives) storing data 734 and instructions such as a web browser, an electronic display (e.g., a monitor having a screen, a small LCD touch-screen or any other electrical device that is operable to display information), and user input (e.g., a keyboard, touch-screen and/or microphone). While the computer system 710 is shown as being within the reference/calibration system 700, it should be understood that the computer system 710 may be external to the system 700 but still communicatively coupled to the components within.

Computer 710 may also include one or more sensors 780. The one or more sensors may be used to detect information in signals received from the FSOC under test. Some examples of sensors include a power meter 782, a position sensor 784, and an image capture device 786, but it should be understood that any of a number of sensors may be included. The sensors 780 may communicate with the computer 710 to detect the information, and to trigger an action by another component of the system 700. For example, information detected by any of the sensors 780 may trigger the computer 710 to cause a platform supporting the system 700 to move, thereby changing an angle of a beam transmitted by the transmitter 750.

The power meter 782 may determines a power level of incoming signals from a FSOC system under test. According to one example, the power meter 782 receives information from signals received at receiver 760. Such information may include signal strength, bit error rate, SNR, or any of a variety of other information.

The position sensors 784 may detect where an incoming beam hits, for example, on the image capture device 786. For example, the position sensor 784 may detect whether the beam hits at a center of the image capture device 786, at another calibrated or recorded location, or at a different location that signifies misalignment.

The transmitter 750 and the receiver 760 may include any commercially available components, or they may have specialized hardware. While the transmitter 750 and receiver 760 are shown as separate entities, it should be understood that they may be a single transceiver unit. Moreover, while the computer system 710 is shown as being separate from by communicatively coupled with the transmitter 750 and receiver 760, it should be understood that the computer system 710 may be incorporated within either or both of the transmitter 750 and receiver 760.

The light source 754 may be a laser or any other type of light source. Moreover, while the foregoing examples relate primarily to optical communications, it should be understood that such techniques may be adapted to other types of communication as well.

Figure 8:
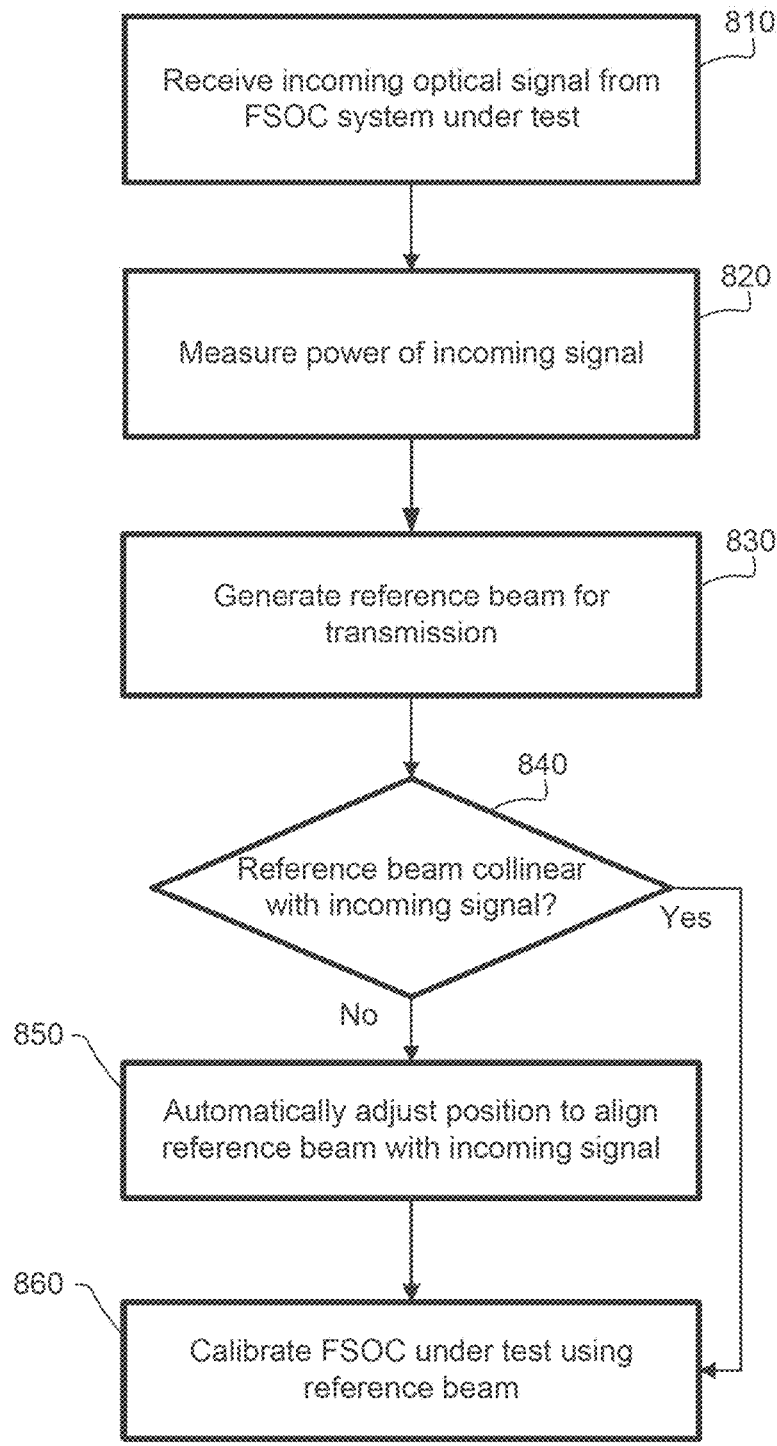
FIG. 8 is a flow diagram illustrating an example method according to aspects of the disclosure.

FIG. 8 illustrates an example method 800 for calibrating an FSOC system under test using the reference/calibration system. While the operations associated with the method 700 are described in a particular order, it should be understood that they may be performed in a different order or simultaneously. Moreover, operations may be added or omitted.

In block 810, an incoming optical signal is received from the FSOC system under test. The optical signal may be, for example, a laser beam. As it is received at the reference/calibration system, it may be redirected by optics within the reference/calibration system to a receiver tip for transmission to a power meter. The optics may be reflective, refractive, or any combination thereof.

In block 820, power of the incoming signal is measured, for example, using the power meter. The power meter may be, for example, a lux meter, an intensity meter, a flash meter, a general power meter, or any other type of device for measuring aspects of an optical beam, such as power in watts or lumens, intensity, etc.

In block 830, a reference beam is generated for transmission back to the FSOC system under test. The reference beam may be transmitted simultaneously with receipt of the incoming signal. For example, the reference beam may be redirected by the optics within the reference/calibration system. The reference beam may be a simple beam of light. In other examples, the reference beam may carry information by communicating bits of data.

In block 840, it is determined whether the incoming signal is collinear with the reference beam. For example, maximum power of the incoming signal may be measured when the incoming signal is properly aligned with the reference beam. For example, when properly aligned, the incoming signal will be at maximum intensity as it directly hits the receiver tip, with a least amount of diffraction or other interference.

If the incoming signal is collinear with the reference beam, the FSOC system under test may be calibrated using the reference beam (block 860). For example, a position of the reference beam as received by the device under test may be recorded at the device under test. This position may be used as a basis of comparison for subsequent signals received at the device under test, as those signals should also be received at the recorded position.

If the incoming signal is not collinear with the reference beam, however, a position of the reference/calibration system may be automatically adjusted in block 850. For example, the reference/calibration system may be rotated, tilted, or otherwise repositioned until the incoming signal is aligned with the reference beam. In some examples, the movement may be based on detected information, such as the detected power. For example, an angling or position of the reference/calibration system may be continually adjusted until a maximum power of the incoming signal is detected.

The reference/calibration system described is the foregoing examples is beneficial in at least that it provides for precise alignment of optical beams and calibration of optical transceivers. Accordingly, optical signals may be transmitted over significant distances with accuracy and precision.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A reference system for testing an optical communication system, the reference system comprising:
   a receiver adapted to receive an optical beam from the optical communication system;
   a transmitter adapted to, simultaneously with the receiving of the optical beam, transmit a reference optical beam; and
   a movable stage on which the receiver and the transmitter are attached, the movable stage being adapted to enable at least one of lateral or vertical movement of the reference system, adjust roll, pitch, or yaw of the receiver and the transmitter, and hold the receiver and the transmitter in a position where the reference optical beam is co-linear with the received optical beam along an entire path between the optical communication system and the receiver.

2. The reference system of claim 1, further comprising reflective optics, the reflective optics providing for achromatization of the optical communication system.

3. The reference system of claim 2, wherein the reflective optics comprise:
   a first focusing mirror positioned to initially receive the optical beam from the optical communication system; and
   a second focusing mirror positioned opposite the first focusing mirror.

4. The reference system of claim 3, wherein the reference system includes a first portion and a second portion, wherein the first portion includes optics for redirecting the received optical beam, and wherein the second portion includes a source for generating the reference optical beam.

5. The reference system of claim 4, further comprising a photonic crystal fiber coupling the first portion of the reference system to the second portion of the reference system.

6. The reference system of claim 5, wherein the photonic crystal fiber is positioned at a focal plane of the reference system, the focal plane positioned opposite the second focusing mirror.

7. The reference system of claim 4, wherein the second portion further includes an optical power meter, wherein the optical power meter is adapted to measure an optical power of the received optical beam.

8. The reference system of claim 1, further comprising one or more processors adapted to automatically adjust the movable stage based on a power of the optical beam detected at the receiver.

9. A reference system for calibrating an optical communication system under test, the reference system comprising:
a receiver adapted to receive an optical signal from the optical communication system under test;
a receiver tip in optical communication with the receiver through optics arranged to redirect the received optical signal to the receiver tip;
a power meter in optical communication with the receiver tip, the power meter configured to determine a power level of the received optical signal;
an optical signal source adapted to generate a reference beam, wherein the power level is used to verify alignment of the reference beam and the received optical signal;
a transmitter adapted to transmit the generated reference beam while the receiver continuously receives optical signals from the optical communication system under test; and
a movable stage adapted to enable at least one of lateral or vertical movement of the reference system, adjust roll, pitch, or yaw of the receiver and the transmitter, and hold the receiver and the transmitter in a position where the reference beam is co-linear with the received optical signal along an entire path between the optical communication system and the receiver.

10. The reference system of claim 9, further comprising one or more processors in communication with the power meter, the one or more processors configured to adjust the reference system based on the power level until the reference beam is colinear with the received optical signal.

11. The reference system of claim 10, further comprising a motorized platform supporting the reference system, wherein movement of the motorized platform is controlled by the one or more processors.

12. The reference system of claim 11, wherein the motorized platform moves with at least six degrees of freedom.

13. The reference system of claim 9, further comprising a fiber coupled between the power meter and the receiver tip, wherein the fiber is adapted to transmit first optical signals from the receiver tip to the power meter while simultaneously transmitting second optical signals from the power meter to the receiver tip.

14. A method for calibrating a free space optical communication system, the method comprising:
receiving, at a reference system, an optical beam transmitted from the optical communication system at a remote position with respect to the reference system;
generating, at the reference system, a reference optical beam;
determining whether the reference optical beam is colinear with the received optical beam;
when the reference optical beam is not colinear with the received optical beam, adjusting a roll, pitch, or yaw of the reference system by controlling a movable stage on which the reference system is mounted until the reference optical beam is colinear with the received optical beam, wherein the movable stage is adapted to enable at least one of lateral or vertical movement of the reference system; and
recording, at the optical communication system, a position of the reference optical beam when the reference optical beam is colinear with the received optical beam.

15. The method of claim 14, further comprising redirecting the received optical beam to a power meter through one or more optical elements, the one or more optical elements including at least one of refractive elements and reflective elements.

16. The method of claim 14, further comprising sending the received optical signal to a power meter through a fiber in a first direction, and sending the generated reference optical beam through the fiber in a second direction opposite the first direction.

17. The method of claim 14, wherein adjusting the position of the reference system comprises moving a platform supporting at least a portion of the receiver and the transmitter.

18. The method of claim 14, further comprising:
receiving, at the optical communication system, second optical signals from a second optical communication system; and
comparing, at the optical communication system, a position of the second optical signal with the recorded position.

* * * * *